(12) United States Patent
Oota (10) Patent No.: US 10,409,031 B2
(45) Date of Patent: Sep. 10, 2019

(54) IMAGE PROJECTION APPARATUS

(71) Applicant: MAXELL, LTD., Kyoto (JP)

(72) Inventor: Mitsuhiko Oota, Tokyo (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/777,095

(22) PCT Filed: Nov. 18, 2015

(86) PCT No.: PCT/JP2015/082369
§ 371 (c)(1),
(2) Date: May 17, 2018

(87) PCT Pub. No.: WO2017/085802
PCT Pub. Date: May 26, 2017

(65) Prior Publication Data
US 2018/0356612 A1 Dec. 13, 2018

(51) Int. Cl.
*G03B 21/28* (2006.01)
*G02B 7/28* (2006.01)
(Continued)

(52) U.S. Cl.
CPC ........... *G02B 7/28* (2013.01); *G02B 26/0833* (2013.01); *G02B 27/0025* (2013.01);
(Continued)

(58) Field of Classification Search
CPC ...... G03B 21/00; G03B 21/005; G03B 21/28; G03B 21/53; G03B 21/208; H04N 9/315;
(Continued)

(56) References Cited

U.S. PATENT DOCUMENTS 6,069,738 A   5/2000   Cathey, Jr. et al.
2003/0184718 A1   10/2003   Childers et al.
(Continued)

FOREIGN PATENT DOCUMENTS

JP   2003-302700 A   10/2003
JP   2008-090257 A   4/2008
(Continued)

OTHER PUBLICATIONS

International Search Report dated Feb. 9, 2016 issued in International Patent Application No. PCT/JP2015/082369 (with English translation).

*Primary Examiner* — Sultan Chowdhury
(74) *Attorney, Agent, or Firm* — McDermott Will & Emery LLP (57) ABSTRACT

An image projection apparatus has: a deformable mirror configured from a plurality of micromirrors; an optical system to form, on the deformable mirror, an intermediate image of an image to be formed based on image data outputted from an image output unit; an imaging device; an image comparator; and a controller for controlling the deformable mirror. The image comparator performs comparison between the image data outputted from the image output unit, and image pickup data of a projection surface, the image of which is picked up by the imaging device, and obtains blur correction amount of the image on the projection surface by each divided region of a projection image, and based on the blur correction amount of the image on the projection surface, said blur correction amount having been obtained by each region, the controller moves, corresponding to the blur correction amount, the micromirrors corresponding to respective regions.

5 Claims, 11 Drawing Sheets

(51) Int. Cl.
*G03B 21/00* (2006.01)
*G03B 21/53* (2006.01)
*G02B 27/00* (2006.01)
*G03B 21/14* (2006.01)
*G02B 26/08* (2006.01)

(52) U.S. Cl.
CPC .......... *G03B 21/00* (2013.01); *G03B 21/142* (2013.01); *G03B 21/28* (2013.01); *G03B 21/53* (2013.01)

(58) Field of Classification Search
CPC ... H04N 9/3102; H04N 9/3126; H04N 9/3185
See application file for complete search history.

(56) References Cited

U.S. PATENT DOCUMENTS

| | | | | |
|---|---|---|---|---|
| 2004/0001644 | A1* | 1/2004 | Kita | G06T 5/20 382/264 |
| 2008/0013055 | A1 | 1/2008 | Matsuura et al. | |
| 2009/0225234 | A1* | 9/2009 | Ward | G03B 33/08 348/744 |
| 2010/0201894 | A1* | 8/2010 | Nakayama | G09G 3/3433 348/745 |
| 2012/0182416 | A1* | 7/2012 | Kawaguchi | H04N 9/3185 348/128 |
| 2014/0104618 | A1 | 4/2014 | Potsaid et al. | |
| 2015/0268545 | A1* | 9/2015 | Baba | G03B 21/2066 353/99 |
| 2015/0331302 | A1 | 11/2015 | Watanuki et al. | |
| 2016/0004219 | A1* | 1/2016 | Leister | G02B 5/32 359/9 |

FOREIGN PATENT DOCUMENTS

| | | |
|---|---|---|
| JP | 2008-225380 A | 9/2008 |
| JP | 2010-117514 A | 5/2010 |
| JP | 2014-202783 A | 10/2014 |
| WO | 2011/102299 A1 | 8/2011 |

\* cited by examiner

← DEFOCUS →

FIG. 8A

IMAGE  PROJECTION
PLANE  PLANE

FIG. 8B

IMAGE  PROJECTION
PLANE  PLANE

IMAGE PROJECTION APPARATUS

CROSS REFERENCE

This patent application is the U.S. National Phase under 35 U.S.C. § 371 of International Application No. PCT/JP2015/082369, filed on Nov. 18, 2015, the entire contents are hereby incorporated by reference.

TECHNICAL FIELD

The present invention relates to an image projection apparatus, and more particularly, to an image projection apparatus suitable for obtaining a clear projected image by correcting blur of a projected image on a projection surface.

BACKGROUND ART

An image projection apparatus (projector) is a device that displays an image or a video by projecting the image or the video on a large screen or the like. In the image projection apparatus, when projecting a projected image on the projection surface, it is required to perform projection with highly accurate focusing.

A technique relating to adjustment of a focal range of the image projection apparatus is disclosed in, for example, Patent Document 1. Patent Document 1 discloses a technique where a phase modulation element (Imaging Lens with EDF 332) that modulates a phase of a light flux is arranged in a projection optical system, a function of allowing a change of a point image along an optical axis direction to be smaller than that of a state where there is no phase modulation element within a certain distance from the focus plane is provided, and by performing image processing such as cancelling a modulation component by the phase modulation element on the image to be projected in advance (Image Coder 314), a focusing range of the projected image is allowed to be larger than a general method.

CITATION LIST

Patent Document

Patent Document 1: U.S. Pat. No. 6,069,738

SUMMARY OF THE INVENTION

Problems to be Solved by the Invention

In recent years, in a short projection type image projection apparatus of which the production amount is increasing, the configuration of the optical system is complicated, and a high adjustment technique is required at the time of production in order to allow the image surface of the projected image to be flat. This is because when the curvature of the image surface is caused by the adjustment error, the projected image is partially blurred on the projection surface.

In addition, in the image projection apparatus, in order to focus the projected image, it is necessary to appropriately set the distance between the image projection apparatus and the projection surface. If the aperture diameter of the projection optical system is constant, the smaller the projection distance is, the more severe the accuracy of setting the distance becomes. Therefore, in the short projection type image projection apparatus, difficulty of setting is especially high. Furthermore, when the projection surface is of a hanging type and is made of a cloth-like material, the distance between the image projection apparatus and the projection surface is changed due to the influence of wind or the like even during the projection, and thus, image blur may occur in some cases.

In addition, in applications such as projection mapping for projecting an image on a three-dimensionally arranged projection target, the range in the optical axis direction where the image can be projected without blur is a specific range determined by the aperture diameter of the projection optical system and the projection distance. However, the image is blurred if the projection target is arranged outside the range in the optical axis direction.

According to the technique described in Patent Document 1, since the focusing range of the projected image can be enlarged in the image projection apparatus, these problems can be solved. However, since image processing such as cancelling the modulation component by the phase modulation element is performed on the image to be projected in advance, edge enhancement processing is required. In order to perform the edge enhancement processing, it is necessary to reduce the dynamic range of the image (the range of the gradation of the image). As a result, the projected image becomes an image with a small dynamic range, so that there is a problem in that visibility is deteriorated.

The invention has been made to solve the above problems, and the invention is to provide an image projection apparatus capable of correcting a variation in distance even during projection by correcting a curvature of an image surface without reducing a dynamic range of a projected image and facilitating setting a distance between the image projection apparatus and a projection surface. The invention is to provide an image projection apparatus capable of enlarging a range in an optical axis direction where a projection target can be arranged without causing image blur in applications such as projection mapping.

Solutions to Problems

An image projection apparatus according to the invention is an image projection apparatus that projects image data output from an image output unit onto a projection surface by light emitted from a light source and includes: a deformable mirror that is configured with a plurality of micromirrors; an optical system that forms an intermediate image of an image based on the image data output from the image output unit on the deformable mirror; an imaging device that images the projection surface; an image comparator that inputs the image data output from the image output unit and imaging data of the projection surface imaged by the imaging device; and a controller that controls the deformable mirror. The image comparator compares the image data output from the image output unit and the imaging data of the projection surface imaged by the imaging device to obtain a blur correction amount of an image on the projection surface for each of divided regions of the projected image, and the controller moves the micromirror corresponding to each region according to the blur correction amount based on the blur correction amount of the image on the projection surface obtained for each region to project an intermediate image of the image formed on the deformable mirror.

Preferably, in the image projection apparatus, a cylindrical lens is arranged in the imaging device. In addition, in the image projection apparatus, the image comparator analyzes the image formed on an imaging element of the imaging device for each region and provides an instruction of a moving direction of a micromirror corresponding to each region to the controller based on a result of comparing blur amounts in two orthogonal directions within the image.

Effects of the Invention

According to the invention, it is possible to provide an image projection apparatus capable of correcting a variation in distance even during projection by correcting a curvature of an image surface without reducing a dynamic range of a projected image and facilitating setting a distance between the image projection apparatus and a projection surface. In addition, it is possible to provide an image projection apparatus capable of enlarging the range in the optical axis direction where the projection target can be arranged without causing image blur in applications such as projection mapping.

MODE FOR CARRYING OUT THE INVENTION

Hereinafter, embodiments of the invention will be described by means of FIGS. 1 to 12.

First Embodiment

Hereinafter, a first embodiment of the invention will be described by means of FIGS. 1 to 9.

First, overall configurations and operations of an image projection apparatus will be described with reference to FIGS. 1 and 2.

Figure 1:
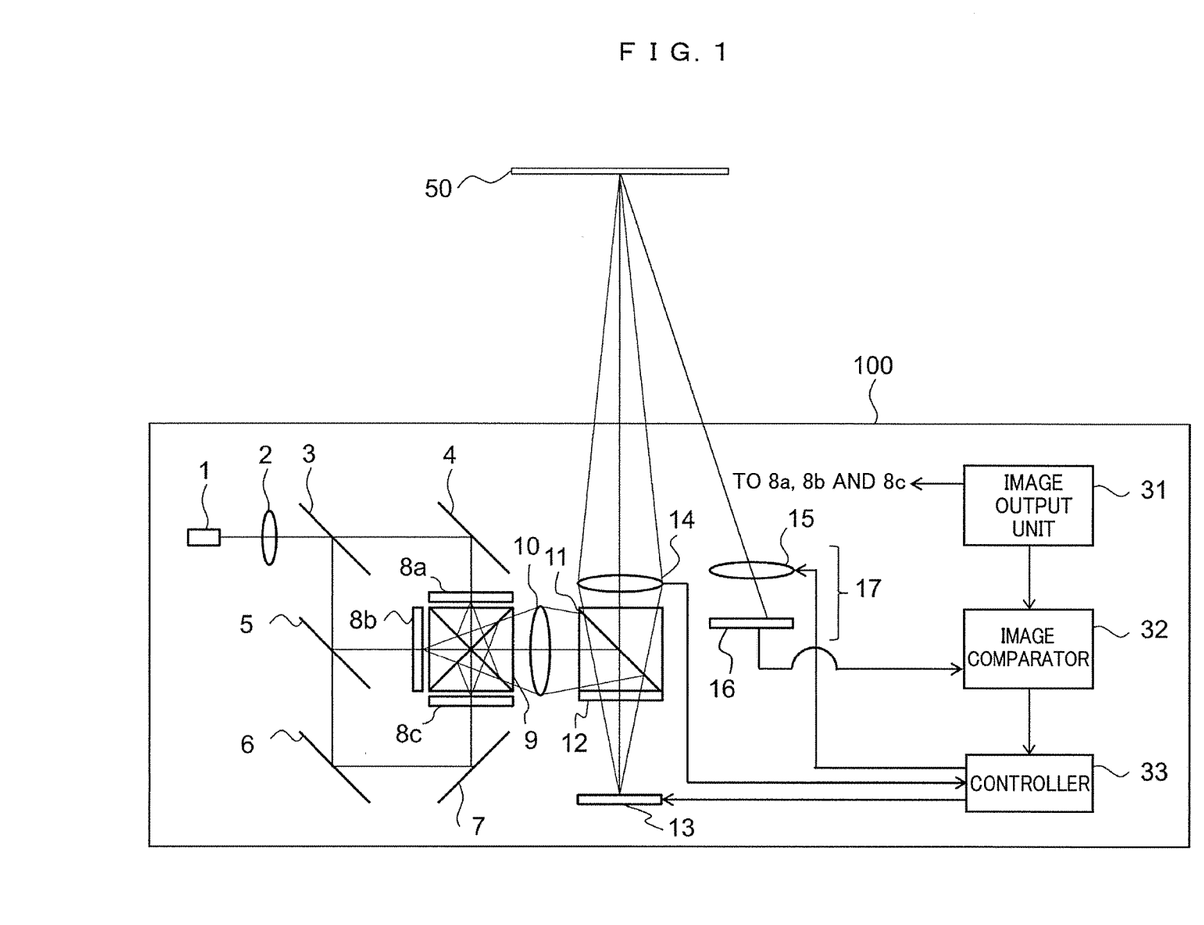
FIG. 1 is a configuration diagram of an image projection apparatus according to a first embodiment of the invention.

FIG. 1 is a configuration diagram of an image projection apparatus according to the first embodiment of the invention.

Figure 2A:
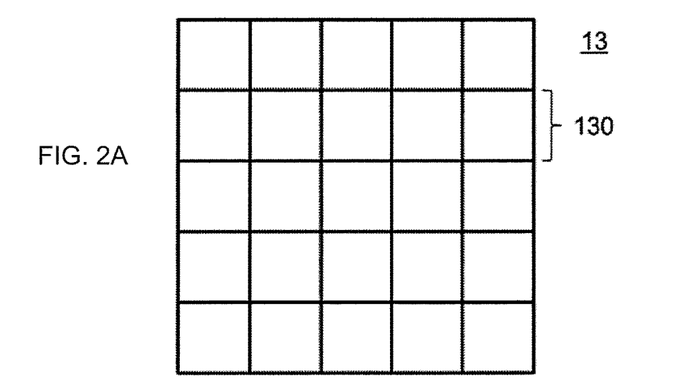
FIGS. 2A and 2B are conceptual diagrams illustrating a configuration and operation of a deformable mirror 13.
Figure 2B:
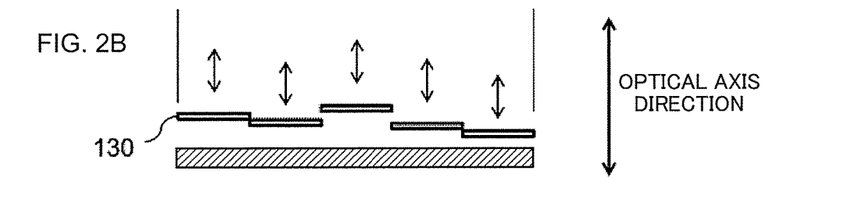

FIG. 2 is a diagram illustrating a configuration example of a deformable mirror.

An image projection apparatus 100 is a device that projects an image on a projection surface 50. As illustrated in FIG. 1, the image projection apparatus 100 includes a light source 1, an integrator lens 2, dichroic mirrors 3 and 5, mirrors 4, 6, and 7, liquid crystal elements 8a, 8b, and 8c, a dichroic prism 9, a lens system 10, a polarization prism 11, a ¼ wavelength plate 12, a deformable mirror 13, a projection optical system 14, an imaging device 17, an image output unit 31, an image comparator 32, and a controller 33. In addition, the imaging device 17 includes an imaging optical system 15 and an imaging element 16.

The light source 1 emits a light flux, and the integrator lens 2 converts the light flux into parallel light. As the light source 1, for example, a metal halide lamp or a super high pressure mercury lamp is used. The dichroic mirror 3 divides the light flux into light fluxes having red, green, and blue wavelengths to transmit only the light flux having the red wavelength and to reflect the light fluxes having the green and blue wavelengths. The mirror 4 guides the light flux having the red wavelength to the liquid crystal element 8a. The dichroic mirror 5 reflects only the light flux having the green wavelength out of the light fluxes having green and blue wavelengths, guides the light flux to the liquid crystal element 8b, and transmits the light flux having the blue wavelength. The mirrors 6 and 7 guide the light flux having the blue wavelength to the liquid crystal element 8c. In this manner, the liquid crystal elements 8a, 8b, and 8c receive the light from the light sources 1 for red, green, and blue wavelengths, respectively. In addition, each of the liquid crystal elements 8a, 8b, and 8c receives a signal from the image output unit 31 and turns on/off the liquid crystal pixel according to the signal. Then, the dichroic prism 9 combines the light fluxes having red, green, and blue wavelengths transmitted through the liquid crystal elements into one light flux.

Next, the lens system 10 provides a lens function to the light flux emitted from the dichroic prism 9 and guides the light flux to the polarization prism 11. Since the polarization prism 11 is arranged so that the linearly polarized light flux emitted from the lens system 10 is incident as S polarized light flux and is designed so as to reflect the S polarized light flux and to transmit the P polarized light flux, the associated light flux is reflected and guided to the ¼ wavelength plate 12. The ¼ wavelength plate 12 converts the light flux into circularly polarized light flux and guides the circularly polarized light flux to the deformable mirror 13. The images expressed by the liquid crystal elements 8a, 8b, and 8c are formed on the reflection surface of the deformable mirror 13. Then, the deformable mirror 13 reflects the light flux and guides the light flux to the ¼ wavelength plate 12. The ¼ wavelength plate 12 converts the light flux from circularly polarized light flux to linearly polarized light flux. Since the light flux as P-polarized light flux is incident on the polarization prism 11, the polarization prism transmits the light flux. The projection optical system 14 provides a lens function to the light flux and guides the light flux to the projection surface 50. In addition, information on the focus position set by the projection optical system 14 is transmitted to the controller 33. The images of the liquid crystal elements 8a, 8b, and 8c are formed on the projection surface 50.

The imaging device 17 receives information on the focus position of the projection optical system 14 from the controller 33, sets the focus position of the imaging optical system 15 to a position coinciding with the focus position of the projection optical system 14, images the projection surface 50, outputs the information of the image from the imaging element 16, and transmits the information to the image comparator 32. The image comparator 32 divides the information of the original image output from the image output unit 31 and the information of the acquired image transmitted from the imaging element 16 into a plurality of regions and performs a comparison operation for each corresponding region to obtain the blur amount for each region of the projected image, converts the blur amount into a control amount to be applied to each component of the micromirror (described later) of the deformable mirror, and outputs the control amount. Herein, the image information is digitally represented, and the image information is represented by RGB values for each pixel.

The controller 33 receives output information output by the image comparator 32 and provides a control signal to the deformable mirror 13 based on the result. In the above description, conversion of the control amount to be applied to each component of the micromirror of the deformable mirror from the blur amount for each region of the projected image is performed by the image comparator, but the conversion may be performed by the controller 33.

The image output unit 31 has a function of outputting a digital signal input from a computer through an HDMI terminal, an analog signal input through a D sub terminal, or an analog signal input from a video device through the D sub terminal to the liquid crystal elements 8a, 8b, and 8c.

The operations performed by the image comparator 32 and the controller 33 are not illustrated, but can be realized by a program that executes the respective functions with hardware having a microprocessor and a work memory. In addition, the operations may be realized by a hardware circuit that executes the respective functions.

Next, a configuration and operation of the deformable mirror 13 will be described with reference to FIG. 2.

FIG. 2 is a conceptual diagram illustrating a configuration and operation of the deformable mirror 13. Herein, FIG. 2(a) is an overhead diagram, and FIG. 2(b) is a side diagram.

The deformable mirror is configured with a plurality of micromirrors and is a mirror that can control the position of each micromirror by external control. As illustrated in FIG. 2(a), the deformable mirror 13 of this embodiment is configured with a plurality of micromirrors 130. For example, the micromirror 130 is coated with aluminum or gold, and by controlling the voltage applied to each micromirror 130, as illustrated in FIG. 2(b), the micromirror 130 is configured to be driven in the optical axis direction (the direction illustrated in the right end in the figure). Herein, in a real case, the deformable mirror 13 is configured with about 32 to 4096 micromirror elements, and the amount of driving of the micromirrors 130 is, for example, about 5 µm.

In the image projection apparatus according to this embodiment, the deformable mirror 13 receives a signal from the controller 33 and drives the micromirror 130 corresponding to each region of the projected image. The blur of the projected image can be corrected by setting the amount of driving of the micromirror 130 to an amount corresponding to the blur amount and setting the driving direction to a direction corresponding to the defocus direction as the source of blur.

Next, a projected image process of the image projection apparatus according to one embodiment of the invention will be described with reference to FIGS. 3A-9.

Figure 3A:
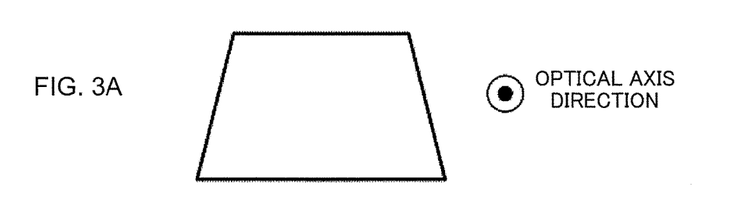
FIGS. 3A and 3B are diagrams for describing shape correction of an acquired image.
Figure 3B:
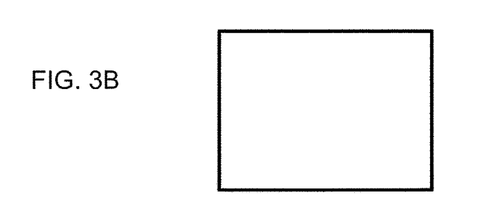

FIGS. 3A and 3B are diagrams for describing shape correction of an acquired image.

Figure 4:
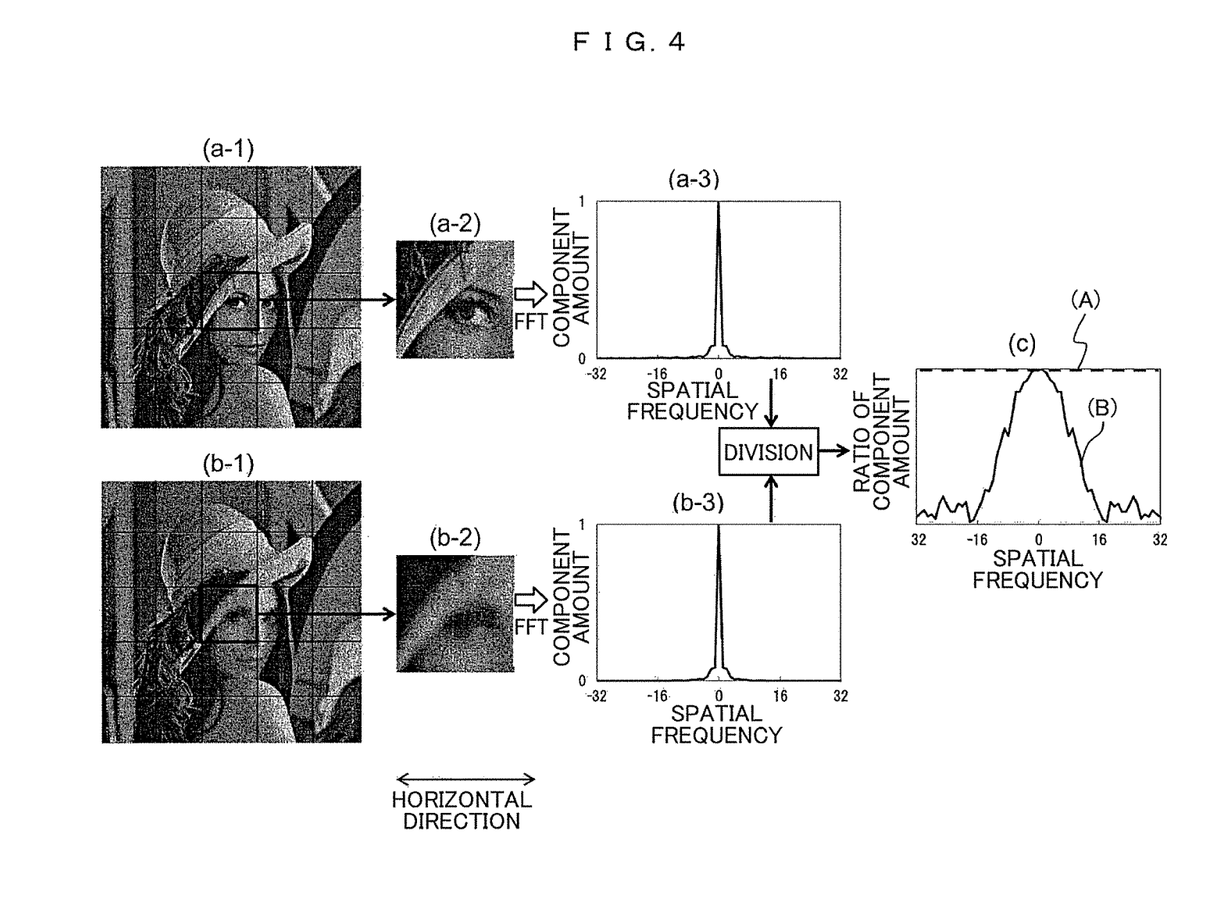
FIG. 4 is an explanatory diagram of a calculation method for blur amount calculation.

FIG. 4 is an explanatory diagram of a calculation method for blur amount calculation.

Figure 5:
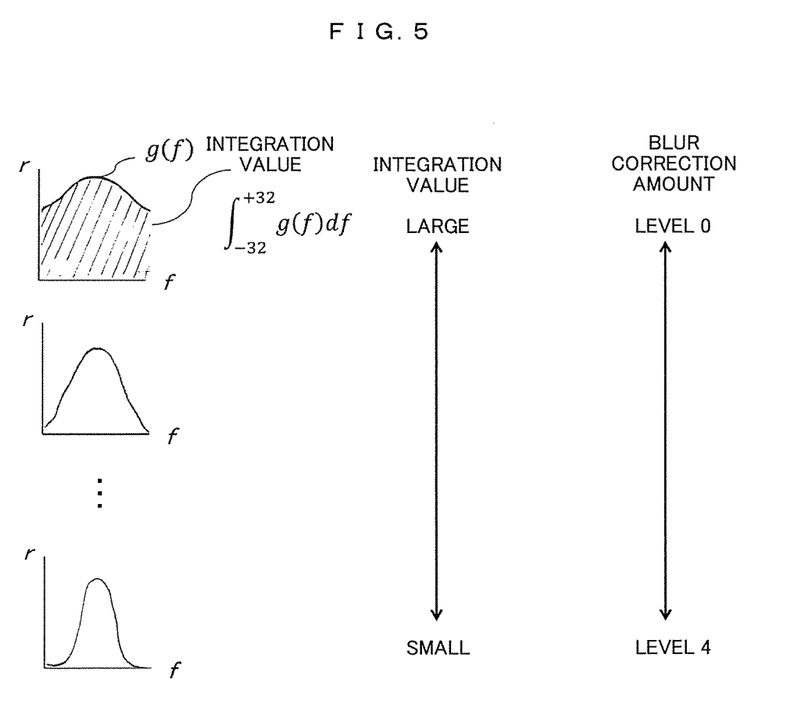
FIG. 5 is a diagram illustrating a relationship between a shape of a transfer function and a blur correction amount of an original image and an acquired image.

FIG. 5 is a diagram illustrating a relationship between a shape of a transfer function and a blur correction amount of an original image and the acquired image.

Figure 6A:
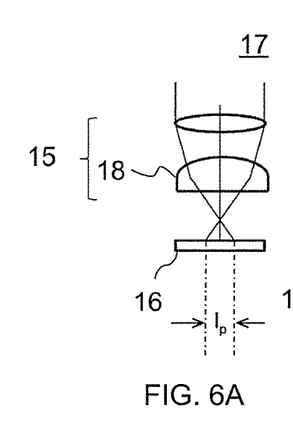
FIGS. 6A and 6B are configuration diagrams of an imaging device 16.
Figure 6B:
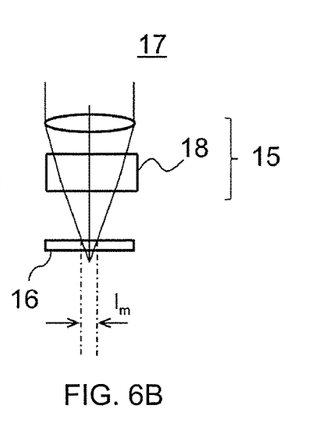

FIGS. 6A and 6B are diagrams of an imaging device 17.

Figure 7A:
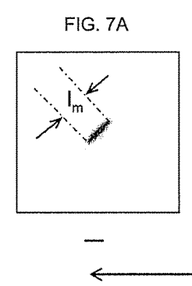
FIGS. 7A through 7C are diagrams illustrating an example of a relationship between defocus and a point image in the case of the configuration of the imaging device 17 in FIGS. 6A and 6B.
Figure 7B:
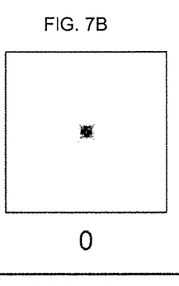
Figure 7C:
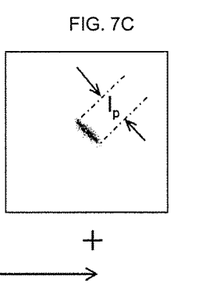

FIGS. 7A-7C are diagrams illustrating an example of a relationship between defocus and a point image in the case of the configuration of the imaging device 17 of FIGS. 6A and 6B.

Figure 8A:
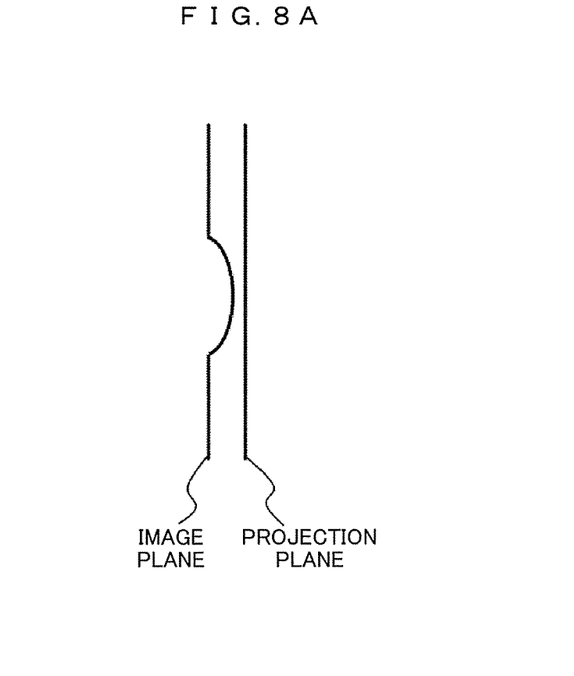
FIG. 8A is a diagram illustrating a relationship between an image surface of a projected image and a projection surface in a case where the image surface is curved.

FIG. 8A is a diagram illustrating a relationship between an image surface of the projected image and a projection surface when the image surface is curved.

Figure 8B:
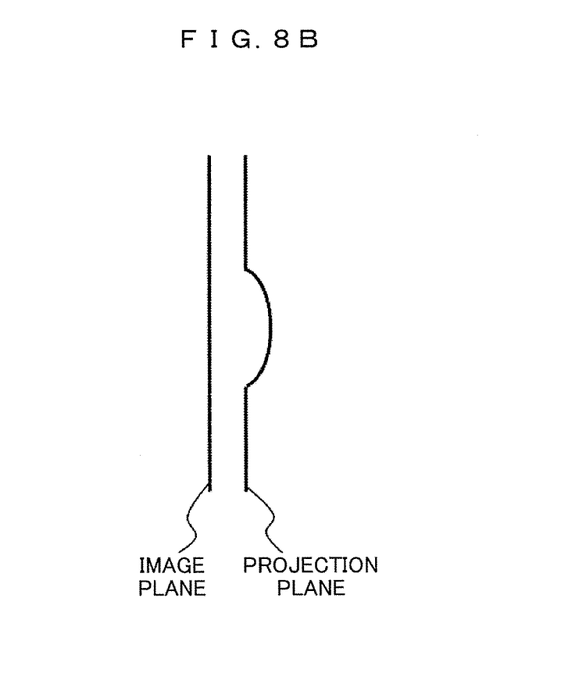
FIG. 8B is a diagram illustrating a relationship between an image surface of a projected image and a projection surface in a case where the projection surface is curved.

FIG. 8B is a diagram illustrating a relationship between the image surface of the projected image and the projection surface when the projection surface is curved.

Figure 9:
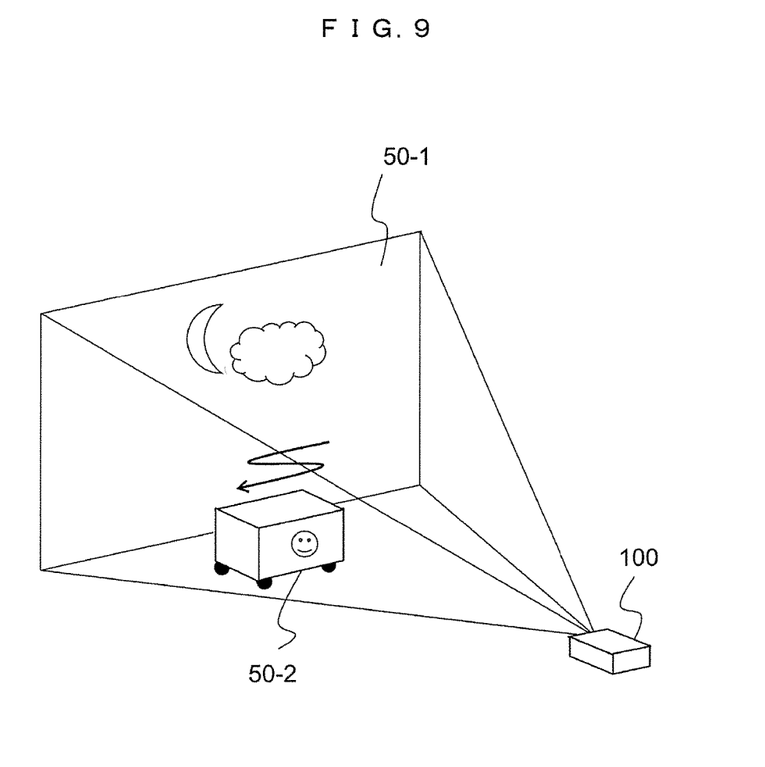
FIG. 9 is a diagram illustrating an example of application to projection mapping.

FIG. 9 is a diagram illustrating an example of application to projection mapping.

First, an example of a method of detecting a blur amount for each region of a projected image will be described with reference to FIGS. 3 and 4.

First, as illustrated in FIGS. 3A and 3B, the image comparator performs geometric transformation on the projected image acquired by the imaging device 17 and performs shape correction. FIG. 3A illustrates a contour before correction of the acquired image, and FIG. 3B illustrates a contour after correction. Herein, the optical axis of the imaging optical system is a direction from the back surface of the paper toward the front surface. In general, since the optical axes are different between the projection optical system and the imaging optical system, the position of the pixel of the acquired image and the position of the pixel of the original image do not correspond to each other, but these positions can be allowed to correspond to each other for comparison by the correction.

Next, as illustrated in FIG. 4, the image comparator 32 divides the original image input from the image output unit and the acquired image by the imaging device 17 into a plurality of corresponding regions, respectively, and performs Fast Fourier Transform (FFT) for each region. In the figure, (a-1) illustrates the original image, (b-2) illustrates the acquired image, and (a-2) and (b-2) are enlarged diagrams of the divided regions of the respective images. In addition, (a-3) and (b-3) are graphs illustrating the results of FFT in the horizontal direction of (a-2) and (b-2), respectively. In this graph, the spatial frequency is sampled from −32 to 32, the component amount of the spatial frequency 0 is set to 1, and a relative ratio of the component amounts of the spatial frequencies is taken and normalized. Then, by taking the ratio of the component amounts of the respective spatial frequencies represented by (a-3) and (b-3), it can be determined how much image blur has occurred between the acquired images from the original image. Herein, FIG. 4(c) illustrates the result of taking the ratio of the component amount of the spatial frequency in the original image and the acquired image. In the figure, the broken line (A) illustrates the transfer function of which value is always 1 irrespective of the spatial frequency and which is in the state where there is no blur. The solid line (B) illustrates the transfer function of which value is decreased at high spatial frequencies and which is in the state where blur occurs. Since the shape of the transfer function is determined according to the blur amount, if a correspondence table of the shape of the transfer function and the blur correction amount is prepared in advance, the blur correction amount for each region can be obtained from the shape of the transfer function by referring to the correspondence table.

For example, as illustrated in FIG. 5, determination can be performed by integrating the graph of FIG. 4(*c*), setting a region with a large value as a region with a small blur correction amount (level 0), and setting a region with a small value as a region with a large blur correction amount (in FIG. 5, the maximum level of 4: 5 steps), and the like.

The method of determining the defocus direction may be a method where, for example, in a case where the projection surface is flat and the shape thereof does not fluctuate and it is desired to eliminate the curvature of the image surface at the time of shipment or startup of the image projection apparatus, since high-speed correspondence is not always required, the micromirrors of the deformable mirror corresponding to the respective regions are moved in any one direction, the blur amount due to the result is calculated, and it is determined that the direction where the blur amount is decreased is an appropriate direction.

On the other hand, in a situation where the image projection apparatus is in use, when the optical system is affected by heat or the like and the shape of the image surface varies, or when the projection surface moves due to the influence of wind or the like, high-speed correspondence is required, it is necessary to determine the defocus direction at a high speed. Herein, an example of a method for detecting the defocus direction of the projected image will be described with reference to FIGS. 6A, 6B, 7A-7C. In the imaging optical system 15 of the imaging device 17 illustrated in FIGS. 6A and 6B, a cylindrical lens 18 is arranged. FIG. 6A is a diagram of the imaging device 17 viewed from the direction where the curve of the cylindrical portion of the cylindrical lens 18 is seen, and FIG. 6B is a diagram of the same imaging device 17 viewed from the direction orthogonal thereto. The cylindrical lens 18 has a function of changing the focusing position of the incident light flux on the imaging optical system 15 depending on the direction. In FIG. 6A, the light is focused on a position before the imaging element 16, and in FIG. 6B, the light is focused on a position farther than the imaging element 16.

FIGS. 7A-7C illustrate a point image on the imaging element 16 when the cylindrical lens 18 is provided. The shape of the point image in the state of no defocus is set to be a shape close to a circle as illustrated in FIG. 7B. Herein, as illustrated in FIG. 6A, in the direction where the curve of the cylindrical portion in the case of focusing in front of the imaging element 16 is visible, the length from the left to the right in the paper on the imaging element 16 is set to $l_p$. As illustrated in FIG. 6B, in the direction orthogonal to the direction of FIG. 6A in the case of focusing at a position far away from the imaging element 16, the length from the left to the right on the imaging element 16 is set to $l_m$. At this time, in a case where the defocus is minus, the shape of the point image becomes a long shape (length $l_m$) in the direction from the lower left to the upper right as illustrated in FIG. 7A, and in a case where the defocus is positive, the shape of the point image becomes a long shape (length $l_p$) in the direction from the upper left to the lower right as illustrated in FIG. 7C. That is, in a case where the defocus is minus, the shape of the blur with the length on the imaging element from the left hand side of FIG. 6B appears in the direction from the lower left to the upper right, and in a case where the defocus is positive, the shape of the blur with the length on the imaging element of the right hand side from the left hand side of FIG. 6A appears in the direction from the upper left to the lower right. For this reason, when calculating the blur correction amount as described above, transfer functions are obtained in two diagonal directions of the direction from the upper left to the lower right and the direction from the lower left to the upper right, and the respective transfer functions are compared, so that it is possible to determine the defocus direction by examining in which direction the blur amount is large.

In addition, in a case where the projection target exists in a specific range in the optical axis direction in applications such as projection mapping and the range is known, if the focus position is set at the farthest or closest projection position, the defocus direction of the other projection target is known, so that it is not necessary to particularly provide a determination means.

According to this embodiment, in the image projection apparatus, in a case where the image surface of the projected image is curved as illustrated in FIG. 8A, it is possible to correct the curvature of the image surface. As a result, the productivity at the time of production of the image projection apparatus is improved, and thus, even if the optical system is affected by heat or the like after shipment, it is possible to suppress a fluctuation in curvature of the image surface. In addition, it is possible to suppress blur caused by a variation in distance between the image projection apparatus and the projection surface. As a result, it is easy to set the distance between the image projection apparatus and the projection surface, and thus, as illustrated in FIG. 8B, even if the shape of the projection surface varies due to disturbance such as wind, it is possible to project an image with blur suppressed.

In addition, in applications such as projection mapping, it is possible to enlarge the range in the optical axis direction where the projection target can exist. FIG. 9 illustrates an application example of the projection mapping according to this embodiment. In the example illustrated in FIG. 9, as the projection surfaces, there are two projection surfaces of a first projection surface 50-1 and a second projection surface 50-2. In addition, the second projection surface can be moved. According to this embodiment, even in the state where the difference between the distance from the image projection apparatus 100 to the first projection surface 50-1 and the distance to the second projection surface 50-2 is larger than the difference in the related art, it is possible to project an image with no blur on both the projection surface 50-1 and the second projection surface 50-2. In addition, even when the second projection surface moves during the projection of the image, it is possible to maintain the non-blurred state of the projected image on both projection surfaces of the first projection surface 50-1 and the second projection surface 50-2.

As described above, according to this embodiment, in the image projection apparatus, it is possible to correct the curvature of the image surface of the projected image. As a result, since it is easy to adjust the image projection apparatus, the productivity at the time of production is improved, and thus, even if the optical system is affected by heat or the like after shipment, it is possible to suppress a fluctuation in curvature of the image surface. In addition, it is possible to suppress blur caused by a variation in distance between the image projection apparatus and the projection surface. As a result, it is easy to set the distance between the image projection apparatus and the projection surface, and thus, even if the distance between the image projection apparatus and the projection surface varies due to disturbance such as wind, it is possible to suppress image blur. In addition, in applications such as projection mapping, it is possible to enlarge the range in the optical axis direction where the projection target can be arranged without causing image blur.

Second Embodiment

Hereinafter, a second embodiment of the invention will be described by means of FIG. 10.

Figure 10:
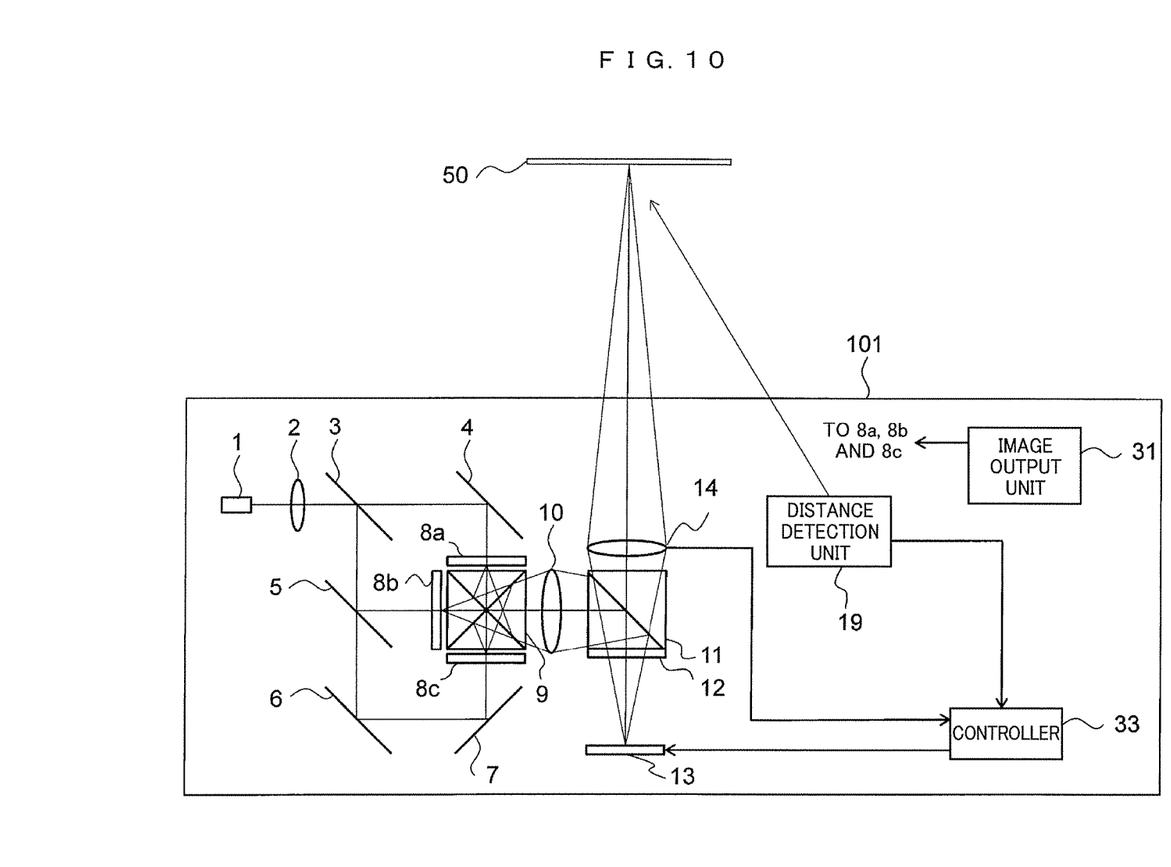
FIG. 10 is a configuration diagram of an image projection apparatus according to a second embodiment of the invention.

FIG. 10 is a configuration diagram of an image projection apparatus according to the second embodiment of the invention.

In this embodiment, it is assumed that the curvature of the image surface of the projected image is small enough to be negligible or has been corrected by another means.

In the second embodiment, as illustrated in FIG. 10, an image projection apparatus 101 projects an image on the projection surface 50. The image projection apparatus 101 has the same configuration as the image projection apparatus 100 according to the first embodiment, except that the imaging device 17 and the image comparator 32 in the image projection apparatus 100 are replaced by a distance detection unit 19. Hereinafter, the points different from the first embodiment will be mainly described.

In this embodiment, the projection surface 50 is divided into a plurality of regions, and the distance to each region is detected by the distance detection unit 19. The distance detection unit may be a mechanism that uses an imaging device, may be a means that transmits light, radio waves (such as infrared rays), ultrasonic waves, or the like and receives the light or the like reflected by the projection surface 50, or may be any other means. In the case of using the imaging device, the distance detection unit may use binocular vision or a phase difference method used for autofocusing. The distance detection unit 19 outputs information on the distance to each region of the projection surface 50. The controller 33 receives information on the focus position set by the projection optical system 14 and receives output information from the distance detection unit 19 and provides a control signal to the deformable mirror 13 based on the result of comparison of both pieces of the information. The deformable mirror 13 receives a signal from the controller 33 and drives the micromirror 130 corresponding to each region of the projection surface 50. The blur of the projected image can be corrected by setting the position after driving of each micromirror 130 to an appropriate position corresponding to the distance to each region of the projection surface 50.

According to this embodiment, in the image projection apparatus, it is possible to suppress blur caused by a fluctuation in distance between the image projection apparatus and the projection surface without detecting blur.

Third Embodiment

Hereinafter, a third embodiment of the invention will be described by means of FIGS. 11, 12A and 12B.

Figure 11:
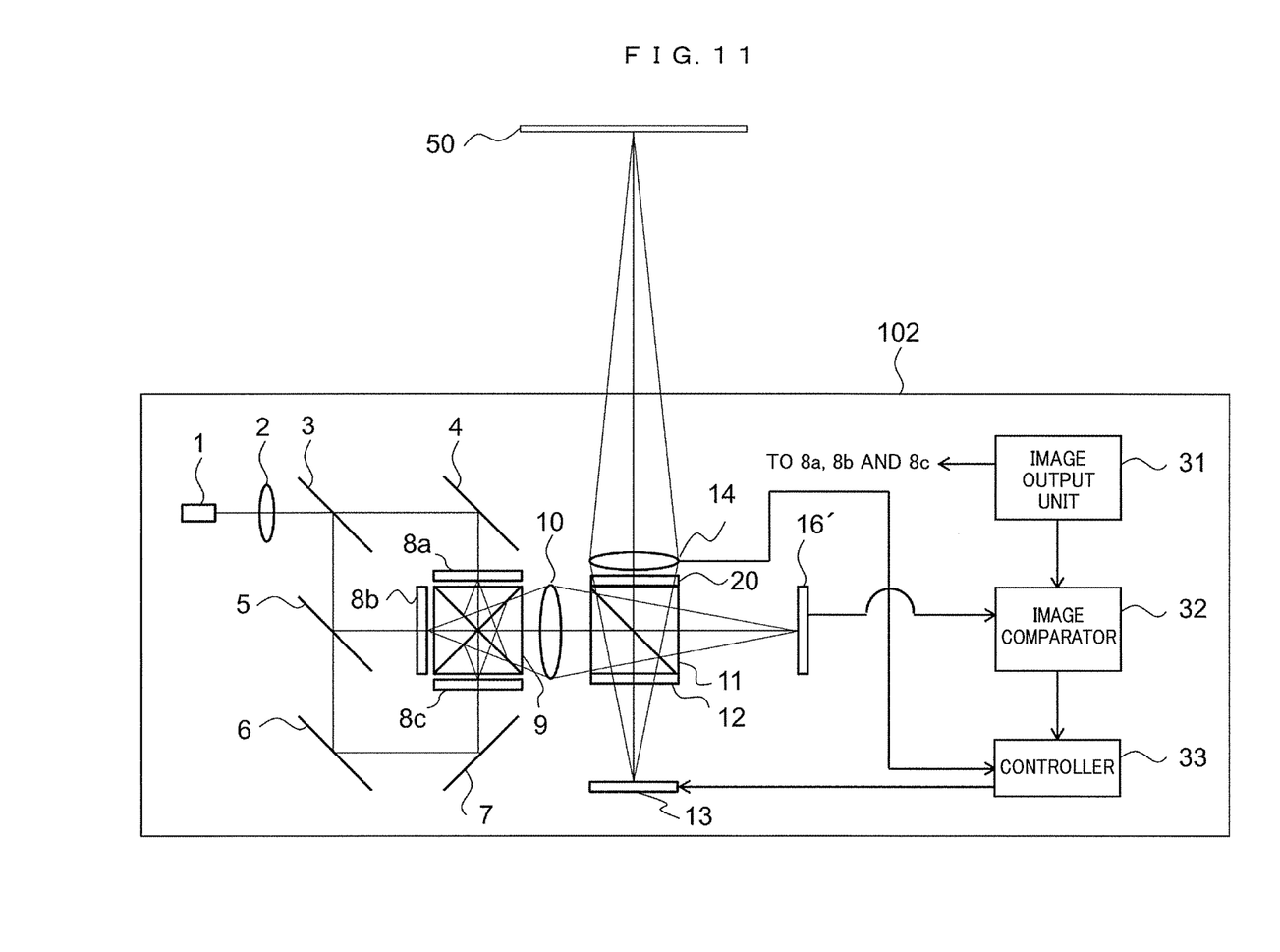
FIG. 11 is a configuration diagram of an image projection apparatus according to a third embodiment of the invention.

FIG. 11 is a configuration diagram of an image projection apparatus according to the third embodiment of the invention.

Figure 12A:
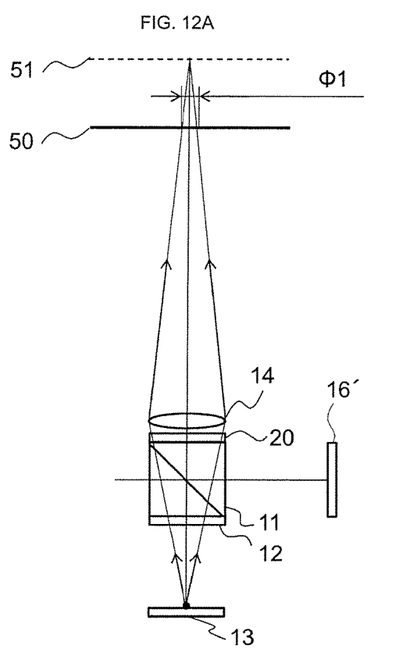
FIGS. 12A and 12B are diagrams describing a blurred state on an imaging element 16' in a case where a focus position and a position of a projection surface 50 are deviated.
Figure 12B:
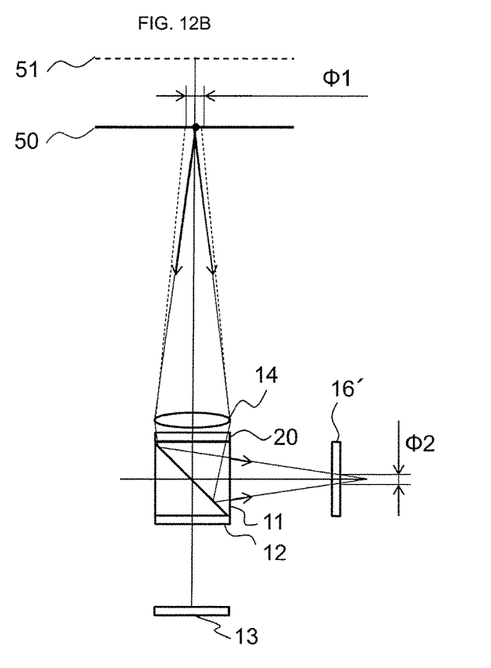

FIGS. 12A and 12B are diagrams describing a blurred state on an imaging element 16' when the focus position and the position of the projection surface 50 are deviated.

In this embodiment, it is also assumed that the curvature of the image surface of the projected image is small enough to be negligible or has been corrected by another means.

In the third embodiment, as illustrated in FIG. 11, an image projection apparatus 102 projects an image on the projection surface 50. The image projection apparatus 102 has the same configuration as the image projection apparatus 100 according to the first embodiment, except that the imaging optical system 15 in the image projection apparatus 100 is omitted, and the projection optical system 14 also serves as the imaging optical system 15, the imaging element 16 is replaced with the imaging element 16', and a second ¼ wavelength plate 20 is added. Hereinafter, points different from the first embodiment will be mainly described.

In this embodiment, the second ¼ wavelength plate 21 converts the outgoing light flux emitted from the polarization prism 11 toward the projection optical system 14 from linearly polarized light flux to circularly polarized light flux. In addition, the light flux reflected by the projection surface 50 and transmitted through the projection optical system 14 is converted from circularly polarized light flux to linearly polarized light flux, and is allowed to be incident on the polarization prism as S polarized light flux. The polarization prism 11 reflects the light flux and guides the light flux to the imaging element 16'. The imaging element 16' is arranged at a position conjugate with the initial state position of the deformable mirror 13. In a case where the focus position of the projection optical system 14 coincides with the projection surface 50, the imaging element 16' is in a position relationship where the imaging element can acquire a focused image. In order to determine the defocus direction, in the case of providing the cylindrical lens described with reference to FIGS. 6A and 6B of the first embodiment, the lens may be provided between the polarization prism 11 and the imaging element 16'.

In this embodiment, since the state of the image acquired by the imaging element 16' is different from that of the first embodiment, the state of the acquired image will be described by means of FIGS. 12A and 12B. FIGS. 12A and 12B illustrate a state where the projection surface 50 is deviated toward the front side from the focus plane 51. In FIG. 12A, a light flux emitted from a representative point on the deformable mirror 13 and directed toward the projection surface 50 is illustrated. The deformable mirror 13 is in the initial state, and the light beam emitted from a point on the deformable mirror 13 and transmitted through the projection optical system 14 is focused on the focus plane 51, but the light beam cannot be focused on the projection surface 50 and becomes a circle having a diameter of which size is presented by Φ1 in the figure. In FIG. 12B, a light flux emitted from a representative point in the circle having the diameter Φ1 on the projection surface 50 and directed toward the imaging element 16' is illustrated. The position where the light is focused is a position farther than the imaging element 16', and the light beam cannot be focused on the imaging element 16' and becomes a circle having a diameter of which size is presented by Φ2 in the figure is formed. That is, the blur on the imaging element 16' becomes blur where the blur having a diameter Φ2 overlaps the blur having a diameter Φ1.

One method of correcting the blur of the projected image in this embodiment is a method of appropriately driving the micromirrors 130 of the deformable mirror 13 to find a position where blur of each region of the acquired image by the imaging element 16' is minimized. That is, since the diameter of the blur on the imaging element 16' where the blur of the acquired image having the above-described relationship is minimized is Φ2, by adjusting the micromirror 130 so that the blur on the imaging element 16' becomes Φ2, it is possible to perform adjustment so that Φ1=0, that is, the blur of the projected image does not occur.

The other method of correcting the blur is a method of using the fact that the defocus amount and the blur amount on the imaging element 16' have a corresponding relationship if the focus position of the projection optical system 14 is fixed. The image comparator 32 calculates the blur amount in each region of the acquired image on the imaging element 16'. The controller 33 acquires the information of the blur amount and the information of the setting of the focus position of the projection optical system 14, obtains the defocus amount from these pieces of the information, and outputs a control signal to the deformable mirror 13 so as to move the micromirror corresponding to each region to the position for correcting the defocus amount, so that the blur can be corrected.

In this embodiment, since the projection optical system and the imaging optical system are common, it is unnecessary to perform shape correction by geometric conversion of the acquired image as illustrated in FIGS. 3A and 3B, so that it is possible to detect the blur with higher accuracy than in the first embodiment and it is possible to suppress the blur caused by a variation in distance between the image projection apparatus and the projection surface. In addition, since the imaging optical system can be omitted, it is expected that the manufacturing cost can be reduced as compared with the first embodiment.

REFERENCE SIGNS LIST

1: light source
2: integrator lens
3, 5: dichroic mirror
4, 6, 7: mirror
8a, 8b, 8c: liquid crystal element
9: dichroic prism
10: lens system
11: polarization prism
12, 20: ¼ wavelength plate
13: deformable mirror
14: projection optical system
15: imaging optical system
16: imaging element
17: imaging device
18: cylindrical lens
19: distance detection unit
31: image output unit
32: image comparator
33: controller
50: projection surface
100, 101, 102: image projection apparatus (first, second, third embodiments)

The invention claimed is:

1. An image projection apparatus projecting an optical image based on input image data onto a projection surface, comprising:
a light source configured to emit light;
a light modulator configured to modulate the light from the light source based on the input image data to form the optical image;
a deformable mirror that is configured with a plurality of micromirrors;
a first optical system configured to guide the optical image formed by the light modulator onto the deformable mirror;
a second optical system configured to project the optical image reflected by the deformable mirror onto the projection surface;
an imaging device configured to obtain imaging data of the projected optical image on the projection surface;
an image comparing processor configured to compare the input image data and the imaging data of the projected optical image from the imaging device; and
a controller configured to control the deformable mirror,
wherein the image comparing processor compares the input image data and the imaging data of the projected optical image to obtain a blur correction amount of the projected optical image for each of several divided regions of the projected optical image, each of the divided regions corresponding to one of the micromirrors, and
wherein the controller moves the position of the micromirror of the deformable mirror corresponding to each divided region to adjust the focus corresponding to each divided region based on the blur correction amount of the projected optical image obtained for each divided region.

2. The image projection apparatus according to claim 1, wherein a cylindrical lens is arranged in the imaging device.

3. The image projection apparatus according to claim 2, wherein the image comparing processor analyzes an image formed on an imaging element of the imaging device for each of the divided regions and provides an instruction of a moving direction of a corresponding micromirror among the plurality of micromirrors constituting the deformable mirror to the controller based on a result of comparing blur amounts in two orthogonal directions within the image.

4. The image projection apparatus according to claim 1, wherein a portion of a projection optical system for projecting the optical image on the projection surface is common to a portion of an imaging optical system of the imaging device.

5. An image projection apparatus projecting an optical image based on input image data onto a projection surface, comprising:
a light source configured to emit light;
a light modulator configured to modulate the light from the light source based on the input image data to form the optical image;
a deformable mirror that is configured with a plurality of micromirrors;
a first optical system configured to guide the optical image formed by the light modulator onto the deformable mirror;
a second optical system configured to project the optical image reflected by the deformable mirror onto the projection surface;
a distance detector configured to measure a distance to the projection surface; and
a controller configured to control the deformable mirror,
wherein the second optical system outputs information about a focus position of the second optical system,
wherein the distance detector detects the distance to the projection surface for each of multiple divided regions of the projection surface and outputs the distance to the controller, each of the divided regions corresponding to one of the micromirrors, and
wherein the controller moves the position of the micromirror of the deformable mirror corresponding to each divided region of the projection surface to control the focus of each divided region based on the information on the focus position of the second optical system input from the second optical system and the distance to each divided region of the projection surface input from the distance detector.

\* \* \* \* \*